United States Patent [19]

Okamura et al.

[11] Patent Number: 4,663,689
[45] Date of Patent: May 5, 1987

[54] TAPE PAD FOR A MAGNETIC TAPE CASSETTE

[75] Inventors: Masatoshi Okamura; Haruo Shiba; Kenkichi Akaoka, all of Saku, Japan

[73] Assignee: TDK Corporation, Tokyo, Japan

[21] Appl. No.: 691,892

[22] Filed: Jan. 16, 1985

[30] Foreign Application Priority Data

Jan. 18, 1984 [JP] Japan ............................. 59-4204[U]

[51] Int. Cl.⁴ ............................................. G11B 23/02
[52] U.S. Cl. ................................... 360/132; 242/199
[58] Field of Search ........................... 360/132, 130.21; 242/199, 198, 200

[56] References Cited

U.S. PATENT DOCUMENTS 4,285,020 8/1981 Sato ..................................... 360/132
4,417,704 11/1983 Oishi ............................... 242/199 X Primary Examiner—A. J. Heinz
Attorney, Agent, or Firm—Oblon, Fisher, Spivak, McClelland & Maier

[57] ABSTRACT

A tape pad for a magnetic tape cassette is placed in the running path of a magnetic tape held in a casing so as to be in press-contact with said magnetic tape. The tape pad has a one piece structure of a tape contacting part and an elastic part for supporting the tape contacting part by molding carbon-containing polyethylene terephthalate.

2 Claims, 4 Drawing Figures

FIGURE 1 *PRIOR ART*
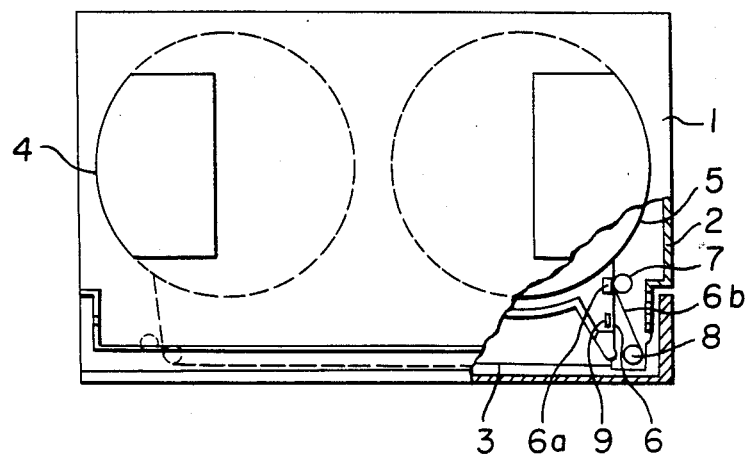
FIGURE 2 *PRIOR ART*
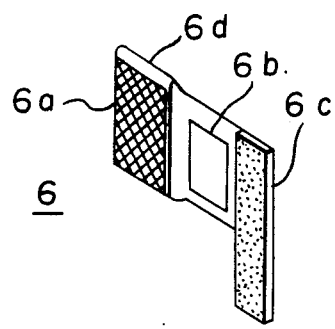

TAPE PAD FOR A MAGNETIC TAPE CASSETTE

BACKGROUND OF THE INVENTION

The present invention relates to a tape pad for a magnetic tape cassette such as a video cassette.

DISCUSSION OF THE RELATED ART

A magnetic tape cassette of this kind is generally constituted, as shown in FIG. 1, by a casing formed by an upper casing 1 and a lower casing 2; reels 4, 5 for winding and running a magnetic tape 3 in the casing; a tape pad 6 in the running path of the magnetic tape 3 between the reels 4, 5 so as to push the magnetic tape 3 by spring pressure of a spring member 6b between a guide 7 and a tape contacting part 6a of the tape pad 6, whereby the stable running of the magnetic tape 3 is maintained. In FIG. 1, the reference numeral 8 designates a guide pole.

FIG. 2 is an enlarged view of a structure of the conventional tape pad 6 wherein the tape contacting part 6a having low static property is bonded at one end of the spring member 6b formed of an elastic plate and a two sided adhesive tape 6c is bonded along the other end of the spring member 6b. The tape pad 6 is installed in the casings 1, 2 by bonding one surface of the two sided adhesive tape 6c to a support 9 connected to the lower casing 2.

There is another proposal for a tape pad having a molded one piece structure consisting of a tape contacting part 6a and a spring member 6b for supporting the tape contacting part 6a, which is made of carbon-blended high pressure process polyethylene.

A two piece structure of a tape pad in which the tape contacting part 6a and the spring member 6b are separate has disadvantages as follows.

(1) The spring member and the tape contacting part must be separately prepared and then, combined. Accordingly, the assembling operation is complicated and expensive.

(2) The spring member 6b is bonded to the tape contacting part 6a with the two sided adhesive tape 6d whereby the tacky adhesive of the two sided adhesive tape 6d is squeezed from the bonded part and is adhered on the surface of the magnetic tape 3 to cause a trouble for magnetic recording and a trouble of the running of the magnetic tape etc.

The tape pad of one piece structure made of the carbon-blended high pressure process polyethylene has drawbacks that elasticity of the tape pad itself becomes inferior due to aging even though manufacturing steps are simplified and it has low thermal deformation temperature and so is easily affected by a change in temperature.

SUMMARY OF THE INVENTION

It is an object of the present invention to eliminate the disadvantages of the conventional magnetic tape cassette and to provide a magnetic tape cassette provided with a tape pad which is of a low manufacturing cost and is stable in aging as well as for a change in temperature.

The foregoing and the other objects of the present invention have been attained by providing a tape pad for a magnetic tape cassette placed in the running path of a magnetic tape held in a casing so as to be in press-contact with the magnetic tape, characterized in that the tape pad has a one piece structure of a tape contacting part and an elastic part for supporting the tape contacting part by molding carbon-containing polyethylene terephthalate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partially cross-sectional view of the conventional magnetic tape cassette;

FIG. 2 is a perspective view of the tape pad used in the conventional magnetic tape cassette;

DETAILED DESCRIPTION OF THE PREFERRED EMBODIMENTS

An embodiment of the presnet invention will be described with reference to drawing.

Figure 3:
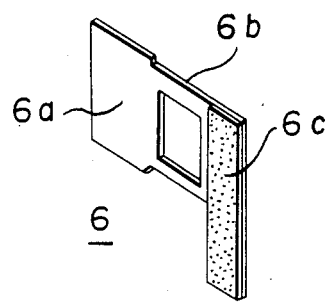
FIG. 3 is a perspective view of a tape pad used for the magnetic tape cassette according to the present invention.

FIG. 3 is a perspective view of an embodiment of the tape pad according to the present invention. In the present invention, a tape contacting part 6a and an elastic part 6b, which were conventionally separate parts, are made in one piece by molding them in one piece. A reference numeral 6c designates a two sided adhesive tape.

With such a construction, it is unnecessary to form the tape contacting part 6a and the elastic part 6b separately and assemble them, on account of which the manufacturing process is shortened and cost of manufacturing and assembling is reduced. Further, it is unnecessary to use an adhesive tape to bond the tape contacting part 6a and the elastic part 6b whereby troubles caused by leakage of the adhesive from the bonded part can be completely eliminated.

For material used for molding the tape contacting part 6a and the elastic part 6b in one piece, polyethylene terephthalate including carbon as an antistatic material is used.

The one piece structure of the tape pad having the tape contacting part and the elastic part has been already known in a publication such as Japanese Unexamined utility Model Publication No. 140978/1981. In the present invention, however, provides further improved tape pad by changing material from carbon-containing high pressure process polyethylene to carbon-containing polyethylene terephthalate (referred to as PET hereinbelow).

A tape pad for a magnetic tape cassette should have a suitably high modulus of elasticity for bending, small change in properties caused by lapse of time and stability to thermal conditions. The inventors of the present invention have been found that the tape pad made of carbon-containing PET is superior to that of carbon-containing high pressure process polyethylene with respect to these properties. Namely, (1) the tape pad of carbon-containing PET assures pad pressures equal to or more than that of carbon-containing high pressure process polyethylene even though the thickness is small and (2) the thermal deformation temperature of the tape pad of carbon-containing PET is 20° C. higher than the conventional tape pad and therefore it is thermally stable.

EXAMPLE

Two kinds of resin blends were prepared by blending an amount ranging from 2% wt. to 10% wt. of carbon black to PET and high pressure process polyethylene (PE) respectively. The resin blends were molded to form the tape contacting part and the elastic part in one piece having a thickness of 180 μm and 200 μm respectively, as shown in FIG. 3. The tape contacting part of PET was finished to have 8 μm of surface roughness. Physical properties of two samples were studied to obtain a result shown in Table 1. As apparent from the Table 1, the tape pad according to the present invention provides remarkable function and effect with respect to above-mentioned points 1 and 2. Further, since the tape contacting part is finished to have a high surface roughness, friction to the magnetic tape is reduced (friction factor in Table 1 is determined with reference to the friction factor of PET without containing carbon black).

Figure 4:
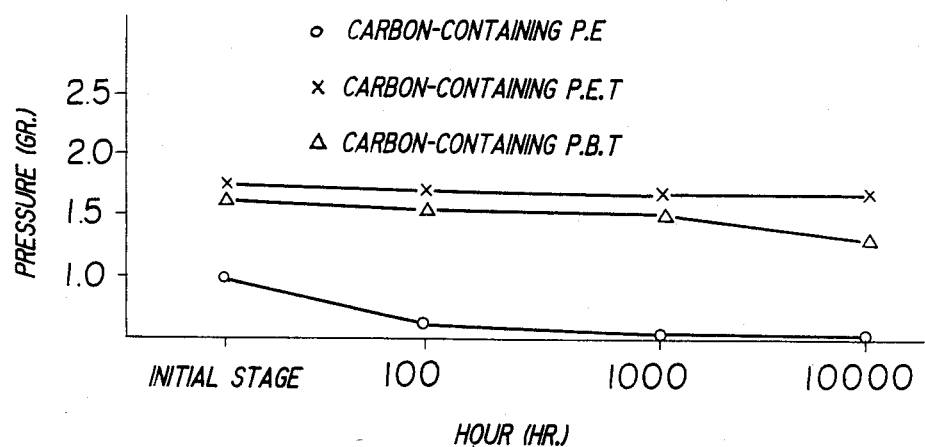
FIG. 4 is a diagram showing change in pad pressure due to aging in which a pad made of carbon-containing high pressure process polyethylene, a pad made of carbon-containing polyethylene terephthalate and a pad made of carbon-containing polybutylene terephthalate are compared.

FIG. 4 shows change in the lapse of time of pad pressure between the tape pad having a thickness of 180 μm of carbon-containing PET and the tape pad having a thickness of 200 μm of carbon-containing high pressure process polyethylene shown in the Table 1. It is revealed that the pad of PET exhibits small change in aging and stableness even though the pad of PET is relatively thin. It is understood from this that the pad of the carbon-containing PET has characteristics superior to the conventional pad. In FIG. 4, properties of a tape pad made of carbon-containing polybutylene terephthalate (PBT) is also shown. Change in aging of the tape pad of the present invention is smaller than that of PBT.

Carbon is incorporated in PET for exhibiting antistatic effect. Preferable range of incorporation is from 2% by weight to 10% by weight of PET.

The tape pad is always in contact with the back surface of the magnetic tape during running of it and the running of the magnetic tape is influenced by the roughness of the contacting surface of the tape pad. When the tape pad has a smooth surface having a roughness of 2 μm or less, the area of contact becomes large to increase friction resistance which renders the running of the magnetic tape to be unstable. When the surface is rough to have a roughness of 15 μm or more, wearing of a part of the pad brought into point-contact with the magnetic tape develops to produce shaved powder to thereby cause dropout. Accordingly, the surface roughness of the pressure-contacting part of the tape pad made of carbon-containing PET is preferably in the range of from 2 μm to 15 μm.

The tape pad formed by molding carbon-containing PET provides the effect as follows.

(1) Change in elasticity caused by lapse of time of the tape pad of the present invention is smaller than the conventional tape pad of carbon-containing high pressure process polyethylene. Accordingly, there is obtainable a stable running of the magnetic tape.

(2) The tape pad of the present invention has elasticity the same as or stronger than that of the conventional tape pad of carbon-containing high pressure process polyethylene even though the thickness of the pad is relatively thin and therefore, is economical.

(3) The tape pad of the present invention has a high thermal deformation temperature characteristic in comparison with the conventional pad and accordingly, it is thermally stable.

TABLE 1

| Comparison of carbon-containing PET with PE | | |
|---|---|---|
| Item | PET | PE |
| Thickness (μm) | 180 | 200 |
| Pad pressure (gr) | 1.8 | 1.0 |
| Inherent resistance of surface (Ω) | 5 × 10$^6$ | 2 × 10$^5$ |
| Roughness of surface (μm) | 8 | 3 |
| Friction factor of surface (for PET) | 0.12 | 0.17 |
| Thermal deformation temperature (°C.) | 80 | 60 |

Obviously, numerous modifications and variations of the present invention are possible in light of the above teachings. It is therefore to be understood that within the scope of the appended claims, the invention may be practiced otherwise than as specifically described herein.

What is claimed is:

1. In a magnetic tape cassette having a casing containing a magnetic tape and a tape guide element, a tape pad comprising:

a one piece structure of molded carbon containing polyethylene terephthalate (PET), said one piece structure including a PET elastic portion and a PET tape contacting portion held pressed against said tape guide element by said elastic portion, with said tape between said tape guide element and said tape contacting portion, such that said PET tape contacting portion is in direct press contact with said tape; and means for supporting said elastic portion relative to said case.

2. The tape pad for a magnetic tape cassette according to claim 1, wherein a press-contacting surface of said tape contacting part has a roughness in the range of from 2 μm to 15 μm.

* * * * *